(12) United States Patent
Botha et al.

(10) Patent No.: US 8,503,449 B2
(45) Date of Patent: Aug. 6, 2013

(54) METHOD, APPARATUS, SYSTEM, AND ARTICLE OF MANUFACTURE FOR PROVIDING DISTRIBUTED CONVERGENCE NODES IN A COMMUNICATION NETWORK ENVIRONMENT

(75) Inventors: Shaun Botha, Seattle, WA (US); Mark D. Bertoglio, Seattle, WA (US)

(73) Assignee: Twisted Pair Solutions, Inc., Seattle, WA (US)

( * ) Notice: Subject to any disclaimer, the term of this patent is extended or adjusted under 35 U.S.C. 154(b) by 334 days.

(21) Appl. No.: 12/724,244

(22) Filed: Mar. 15, 2010

(65) Prior Publication Data

US 2011/0013632 A1   Jan. 20, 2011

Related U.S. Application Data

(63) Continuation of application No. 12/057,289, filed on Mar. 27, 2008, now abandoned.

(60) Provisional application No. 60/908,878, filed on Mar. 29, 2007.

(51) Int. Cl.
*H04L 12/28* (2006.01)

(52) U.S. Cl.
USPC ............ 370/392; 370/401; 370/432; 370/466

(58) Field of Classification Search
USPC .................................. 370/390, 401, 432, 466
See application file for complete search history.

(56) References Cited

U.S. PATENT DOCUMENTS

| | | | |
|---|---|---|---|
| 5,426,637 A | 6/1995 | Derby et al. | |
| 5,903,559 A | 5/1999 | Acharya et al. | |
| 6,122,281 A | 9/2000 | Donovan et al. | |
| 6,131,123 A | 10/2000 | Hurst et al. | |
| 6,647,430 B1 * | 11/2003 | Minyard et al. | 709/251 |

(Continued)

FOREIGN PATENT DOCUMENTS

EP   1613023 A2   1/2006

OTHER PUBLICATIONS

Botha et al. "Method, Apparatus, System, and Article of Manufacture for Providing Distributed Convergence Nodes in a Communication Network Environment," Office Action mailed Sep. 15, 2009 for U.S. Appl. No. 12/057,289, 26 pages.

(Continued)

*Primary Examiner* — Jay P Patel
(74) *Attorney, Agent, or Firm* — Seed IP Law Group PLLC

(57) ABSTRACT

A system, apparatus, article of manufacture, and method provides one or more distributed convergence nodes referred to as "Supernodes", each of which is embodied as a functional technology component within an application that automatically determines whether said component should become "active" and assume the responsibility of forwarding IP multicast data present on a LAN (which supports IP multicast communication) to a "Routing Supernode" via a WAN (which does not support IP multicast communication). The Routing Supernode, in turn, is responsible for forwarding that traffic to other Supernodes present on other LANs. The traffic sent to and from the Routing Supernode is sent via unicast communication. All Supernodes are responsible not only for forwarding traffic present on their respective LAN across the WAN to a Routing Supernode, but they are also responsible for forwarding traffic received over the WAN from the Routing Supernode onto their own respective LANs. An election process determines which device in a LAN is to operate as a SuperNode.

20 Claims, 7 Drawing Sheets

(56) References Cited

U.S. PATENT DOCUMENTS

| | | | |
|---|---|---|---|
| 6,748,447 B1 | 6/2004 | Basani et al. | |
| 6,873,627 B1 | 3/2005 | Miller et al. | |
| 6,963,563 B1 | 11/2005 | Wong et al. | |
| 7,103,011 B2 | 9/2006 | Kumar et al. | |
| 7,286,532 B1 | 10/2007 | Rachepalli et al. | |
| 7,710,961 B2 * | 5/2010 | Miller et al. | 370/390 |
| 8,081,629 B2 * | 12/2011 | Miller et al. | 370/390 |
| 2002/0191612 A1 * | 12/2002 | Curtis | 370/392 |
| 2002/0196802 A1 * | 12/2002 | Sakov et al. | 370/432 |
| 2003/0037160 A1 * | 2/2003 | Wall et al. | 709/233 |
| 2003/0135638 A1 * | 7/2003 | Brabson et al. | 709/232 |
| 2003/0210656 A1 * | 11/2003 | Biacs et al. | 370/252 |
| 2005/0008024 A1 * | 1/2005 | Newpol et al. | 370/401 |
| 2005/0021616 A1 | 1/2005 | Rajahalme et al. | |
| 2005/0100016 A1 * | 5/2005 | Miller et al. | 370/390 |
| 2006/0146921 A1 * | 7/2006 | Vermeersch et al. | 375/222 |
| 2006/0159090 A1 * | 7/2006 | Chang et al. | 370/390 |
| 2007/0067487 A1 | 3/2007 | Freebairn et al. | |
| 2007/0280230 A1 | 12/2007 | Park | |
| 2008/0013465 A1 | 1/2008 | Yasukawa et al. | |
| 2008/0112404 A1 * | 5/2008 | Kuri et al. | 370/389 |
| 2008/0205395 A1 | 8/2008 | Boddapati et al. | |

OTHER PUBLICATIONS

International Search Report, mailed Jul. 8, 2008, for PCT/US2008/58718, 2 pages.
International Preliminary Report on Patentability, mailed Feb. 26, 2010, for PCT/US2008/58718, 17 pages.
Written Opinion, mailed Jan. 21, 2009, for PCT/CA2008/001778, 6 pages.
Office Action mailed Mar. 28, 2012, for Australian Patent Application No. 2008232640, 3 Pages.
Higgins L., et al., "Tunneling Multicast Traffic Through Non-Multicast-Aware Networks and Encryption Devices," MILCOM 2001, Proceedings. Communications for Network-Centric Operations: Creating the Information Force, McLean, VA, Oct. 28-30, 2001; IEEE Military Communications Conference, New York, NY: IEEE, US, vol. 1, Oct. 28, 2001 pp. 296-300.
Extended European Search Report for EP08744648.0 dated Jun. 18, 2012, 9 pages.

\* cited by examiner

METHOD, APPARATUS, SYSTEM, AND ARTICLE OF MANUFACTURE FOR PROVIDING DISTRIBUTED CONVERGENCE NODES IN A COMMUNICATION NETWORK ENVIRONMENT

CROSS REFERENCE TO RELATED APPLICATION

This application is a continuation of U.S. patent application Ser. No. 12/057,289, filed Mar. 27, 2008, which claims benefit under 35 U.S.C. §119(e) of U.S. Provisional Patent Application Ser. No. 60/908,878, entitled "METHOD, APPARATUS, SYSTEM, AND ARTICLE OF MANUFACTURE FOR PROVIDING SUPERNODES IN A COMMUNICATION NETWORK ENVIRONMENT," filed Mar. 29, 2007, assigned to the same assignee as the present application, and incorporated herein by reference in its entirety.

TECHNICAL FIELD

This disclosure relates generally to computer software and/or hardware for computer and communication systems networking, and more particularly but not exclusively relates to communication between devices through a communication network.

BACKGROUND INFORMATION

Highly scalable, high-bandwidth applications such as voice over IP (VoIP) systems frequently utilize Internet Protocol (IP) multicast technologies to efficiently distribute audio communications amongst large numbers of users. While an extremely efficient use of available network bandwidth, configuration of the IP multicast infrastructure can be an administratively intensive task requiring the cooperation and coordination of numerous stakeholders and their organizations. As the distribution of IP multicast data becomes even more widespread within an organization and between organizations, the administrative task increases exponentially, resulting in increased costs and time being incurred to set up and maintain the network infrastructure.

The issue of network infrastructure maintenance becomes even more complex and time-consuming when the distribution of IP multicast data is required over Wide Area Networks (WANs)—as opposed to the (relatively) simple task of distributing such IP multicast traffic over Local Area Networks (LANs).

BRIEF SUMMARY

One aspect provides a method for communicating in a communication network environment, the environment including at least a first, a second, and a third local area network (LAN) separated from each other by a wide area network (WAN), the LANs being IP-multicast-capable and the WAN being non-IP-multicast-capable. The method includes:

electing a device in the first LAN as a first distributed convergence node;

designating a device in the second LAN as a second distributed convergence node, the second distributed convergence node being a routing distributed convergence node;

electing a device in the third LAN as a third distributed convergence node; and communicating traffic between the first and third distributed convergence nodes via the routing distributed convergence node, wherein the traffic can be communicated between devices within each of the LANs using IP multicast communication, and wherein the traffic can be communicated between the first distributed convergence node and the routing distributed convergence node and between the routing distributed convergence node and the second distributed convergence node using unicast communication.

Another aspect provides a system for communicating in a communication network environment, the environment including at least a first, a second, and a third local area network (LAN) separated from each other by a wide area network (WAN), the LANs being IP-multicast-capable and the WAN being non-IP-multicast-capable. The system includes:

first distributed convergence node means in the first LAN for communicating traffic with devices in the first LAN using IP multicast communication and for communicating traffic from the devices over the WAN via unicast communication;

second distributed convergence node means in the second LAN for receiving the traffic communicated via unicast communication over the WAN from the first distributed convergence node means, the second distributed convergence node means being a routing distributed convergence node means for forwarding the traffic over the WAN using unicast communication;

third distributed convergence node means in the third LAN for receiving the traffic communicated by the routing distributed convergence node over the WAN using unicast communication, the third distributed convergence node means further being for distributing the received traffic to devices in the third LAN via IP multicast communication and for communicating traffic from the devices over the WAN to the routing distributed convergence node via unicast communication; and electing means for electing a device as first, second, and third distributed convergence nodes, the distributed convergence nodes being dynamically changeable as a result of the electing.

Still another aspect provides an apparatus adapted to be used in a communication network environment, the environment including at least a first, a second, and a third local area network (LAN) separated from each other by a wide area network (WAN), the LANs being IP-multicast-capable and the WAN being non-IP-multicast-capable. The apparatus includes:

a device having a distributed convergence node module, the distributed convergence node module including:

an elector module to elect the device as a first distributed convergence node in the first LAN;

an identifier module to identify the device from other devices in the first LAN, including identification of the device as the elected first distributed convergence node; and a network interface in cooperation with a processor to communicate with the other devices in the first LAN using IP multicast communication and to communicate with a routing distributed convergence node in the second LAN via the WAN using unicast communication if the device is elected as the first distributed convergence node, so as to allow the routing distributed convergence node to forward communication via the WAN between the first distributed convergence node in the first LAN and a third distributed convergence node in the third LAN.

Yet another aspect provides an apparatus adapted to be used in a communication network environment, the environment including at least a first, a second, and a third local area network (LAN) separated from each other by a wide area network (WAN), the LANs being IP-multicast-capable and the WAN being non-IP-multicast-capable. The apparatus includes:

a device having a routing distributed convergence node module, the routing distributed convergence node module including:

an elector module to elect the device as a routing distributed convergence node in the second LAN;

an identifier module to identify the device from other devices in the second LAN, including identification of the device as the elected routing distributed convergence node; and a network interface in cooperation with a processor to communicate with the other devices in the second LAN using IP multicast communication and to communicate with a first distributed convergence node in the first LAN via the WAN using unicast communication and to communicate with a third distributed convergence node in the third LAN via the WAN using unicast communication, so as to forward traffic between the first and third distributed convergence nodes over the WAN.

Still another aspect provides an article of manufacture adapted to be used in a communication network environment, the environment including at least a first, a second, and a third local area network (LAN) separated from each other by a wide area network (WAN), the LANs being IP-multicast-capable and the WAN being non-IP-multicast-capable. The article of manufacture includes:

a computer-readable medium adapted to be installed in one of the devices and having computer-readable instructions stored thereon that are executable by a processor to:

elect the device as a distributed convergence node;

identify the device from other devices in a same LAN as the device, including identification of the device as the elected distributed convergence node; and communicate with the other devices in the same LAN using IP multicast communication and communicate with another distributed convergence node via the WAN using unicast communication, so as to enable transparent communication between distributed convergence nodes of different LANs via the WAN using unicast communication in a manner that makes the WAN appear to be IP-multicast-capable.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified or unless the context is otherwise.

DETAILED DESCRIPTION

Figure 1:
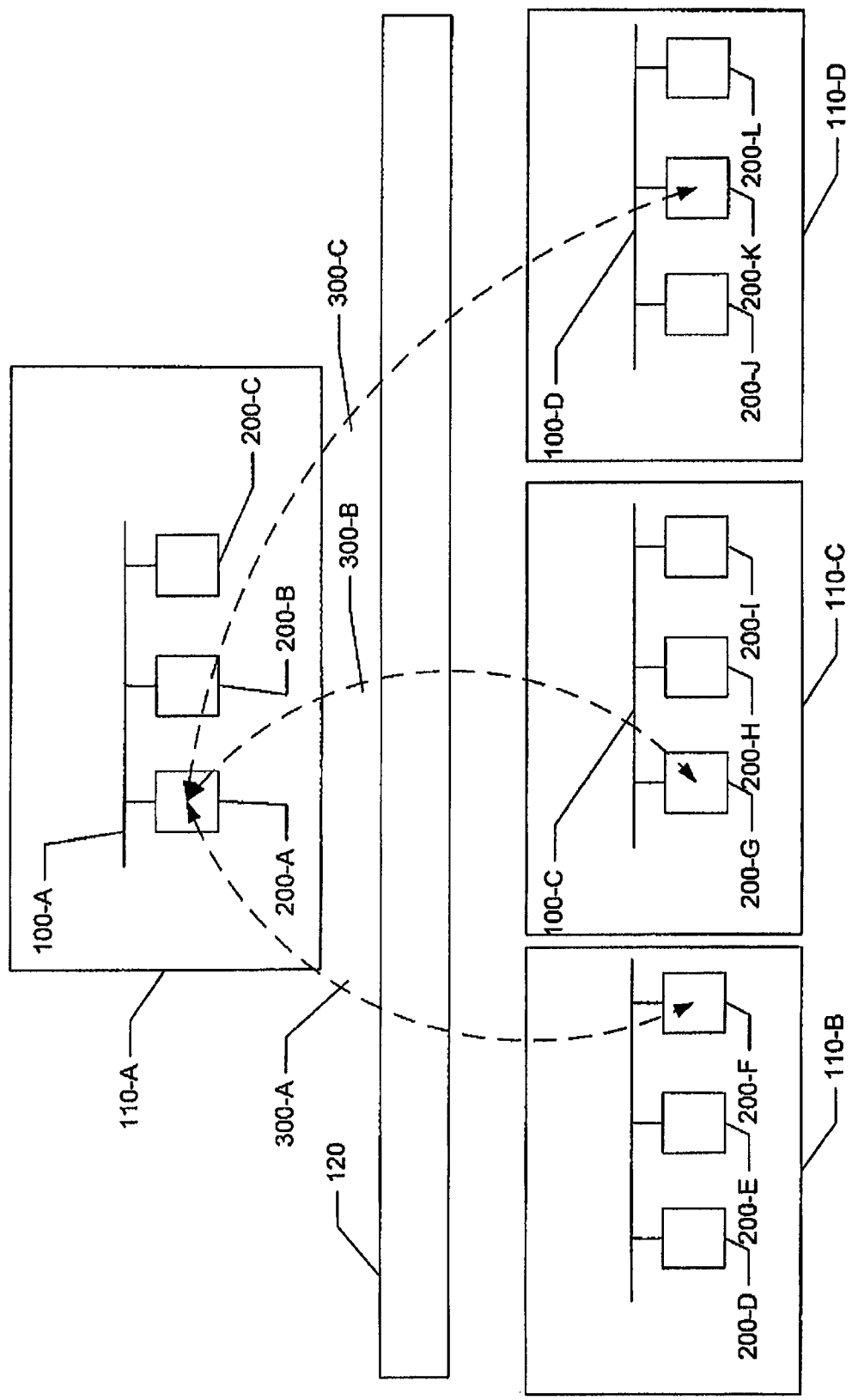
FIG. 1 is a logical system block diagram according to one embodiment. The diagram shows the manner in which a variety of endpoints (200-A through 200-C, 200-D through 200-F, 200-G through 200-I, and 200-J through 200-L) are each capable of communicating over IP multicast within their own IP multicast islands (110-A, 110-B, 110-C, and 110-D respectively), but are not able to communicate via IP multicast over the unicast network 120. In this embodiment, endpoints 200-F, 200-G, and 200-K establish unicast connections (300-A, 300-B, and 300-C respectively) across the unicast network 120 to a routing node 200-A.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the embodiments.

One solution to problems described above is an embodiment wherein the very applications themselves that are used by users on their computers (or other types of devices) for communications with other such devices effectively become part of the network routing infrastructure, coordinating with other instances of the applications to efficiently distribute IP multicast data—especially but not exclusively over the WAN or other network where the most administrative complexity is required on an on-going basis. Such technology (including related functionality) is referred to at times herein as "Supernode(s)" and/or as equivalently as one or more "distributed convergence nodes" and/or more generally as at least one convergence node (including a plurality of convergence nodes or individual distributed convergence nodes).

At least some portions of the various embodiments of the Supernode technology can be implemented in conjunction with the various systems, apparatus, articles of manufacture, and/or methods disclosed in U.S. patent application Ser. No. 10/977,115, entitled "WIDE AREA VOICE ENVIRONMENT MULTI-CHANNEL COMMUNICATIONS SYSTEM AND METHOD," filed Oct. 29, 2004, assigned to the same assignee (Twisted Pair Solutions, Inc.) as the present application, and incorporated herein by reference in its entirety.

According to one embodiment, a Supernode includes a functional technology component within an application that automatically determines whether it (the component) should become "active" and assume the responsibility of forwarding IP multicast data present on the LAN (or other network) across the WAN (or other network) to a "Routing Supernode" which, in turn, is responsible for forwarding that traffic to other Supernodes present on other LANs (or other networks). All Supernodes are responsible not only for forwarding traffic present on the LAN (or other network) across the WAN (or other network) to a Routing Supernode, but they are also responsible for forwarding traffic received over the WAN (or other network) from the Routing Supernode onto their own LANs (or other network)—thereby creating the appearance of a "flat" IP multicast network to the hosting application along with other multicast applications on the LAN (or other network). In effect, a device at location A (e.g., New York) can transparently communicate with another device at location B (e.g., Los Angeles) across what each believe to be a fully IP multicast enabled network. A feature though is that Supernodes at each location along with one or more Routing Supernodes are in actuality creating the appearance of a virtual "flat" IP multicast network even though IP multicast is truly only present at each location (the individual LANs or other networks) but not between the locations (across the WAN or other network).

Such locations where IP multicast is available to applications but is bordered at some physical or logical boundary—beyond which IP multicast does not flow—is referred to herein as a "multicast island".

A feature with Supernodes according to an embodiment is that they are part of the applications themselves (and not separate solutions), and that the Supernode components present within each application communicate with each other in near real-time over the IP network to determine which component housed on which device on the network will become the forwarding entity.

One embodiment's use in the form of an end-user application in a client device is not its only implementation. Another embodiment is also used on non-user computing devices such as server computers and specialized appliances. In either case (end-user or otherwise), the same functionality afforded by the embodiment(s) to one implementation may be afforded the other.

The functionality of the embodiment(s) is to create a virtualized IP multicast network comprising of two or more IP multicast enabled networks separated by one or more non-IP multicast capable networks. As such, an embodiment is responsible for inserting itself into an application or device designed for IP multicast such that data received from and transmitted to the IP multicast network by the application or device is relayed by unicast connection across the intervening non-IP multicast enabled networks. The result of this operation is that applications or devices across the entire network—including those on different sides of non-IP multicast enabled networks—are capable of communicating with each other using IP multicast even though IP multicast is not available end-to-end across the entire network.

For the sake of simplicity of explanation hereinafter, the various networks in which the embodiments are implemented will be described in terms of LANs and WANs. Embodiments may be implemented in other types of networks, which may be variations and/or combinations of WANs and LANs, or completely different from WANs and LANs.

As depicted in FIG. 1, in an embodiment, routing node 200-A functions to route traffic received across unicast connections 300-A, 300-B, and 300-C to all other unicast connections (and thus operates as a routing Supernode or as a routing distributed convergence node), as well as functioning to forward such traffic to its own local IP multicast network 100-A. Nodes receiving traffic over unicast connection from routing node 200-A follow similar operation—forwarding such traffic to their own respective IP multicast networks. For example: data received by routing node 200-A from endpoint 200-F over unicast connection 300-A is routed by routing node 200-A to endpoints 200-G and 200-K over their respective unicast connections 300-B and 300-C. In addition, routing node 200-A functions to forward traffic received over unicast connections to the local IP multicast network 100-A thereby making such traffic available to endpoints 200-B and 200-C. Similarly, endpoints receiving unicast traffic across the Wide Area Network 120 function to forward such traffic to their own local IP multicast network, making such traffic available to endpoints local to their respective networks. For example: traffic received from routing node 200-A by endpoint 200-K over unicast connection 300-C is forwarded by endpoint 200-K to the local IP multicast network 100-D making such traffic available as multicast traffic to endpoints 200-J and 200-L. In addition, nodes 200-A, 200-F, 200-G, and 200-K also serve to forward traffic received over the unicast WAN 120 to the application they are hosted within or coupled to, so as to create the same appearance of virtualized IP multicast for the hosting/coupled application as is created for other nodes on each node's respective local IP multicast network.

In one embodiment, each of said endpoints is associated with a network address, such as an IP address. The network address of any particular endpoint designated/elected as a Supernode or as a Routing Supernode can be made known to all other Supernodes. The address can be made known, for example, by statically programming or otherwise providing each Supernode with the IP address of a Routing Supernode. Alternatively or additionally, the IP address of the Routing Supernode can be made known to other Supernodes in a dynamic manner, such as by broadcasting the address or otherwise communicating the address to the various Supernodes.

According to various embodiments, the nodes 200 may implemented on or as a device such as a client device and/or on non-user computing devices such as server computers and specialized appliances. Examples of client devices include, but are not limited to, personal computers (PCs), laptops, wireless devices (such as cellular telephones, PDAs, and so forth), set top boxes, and/or any other portable or stationary electronic communication device that can have network connectivity. Examples of non-user devices can include servers (as mentioned above), routers, switches, and other wireless and/or hardwired device that can have network connectivity.

Node Election

Figure 2:
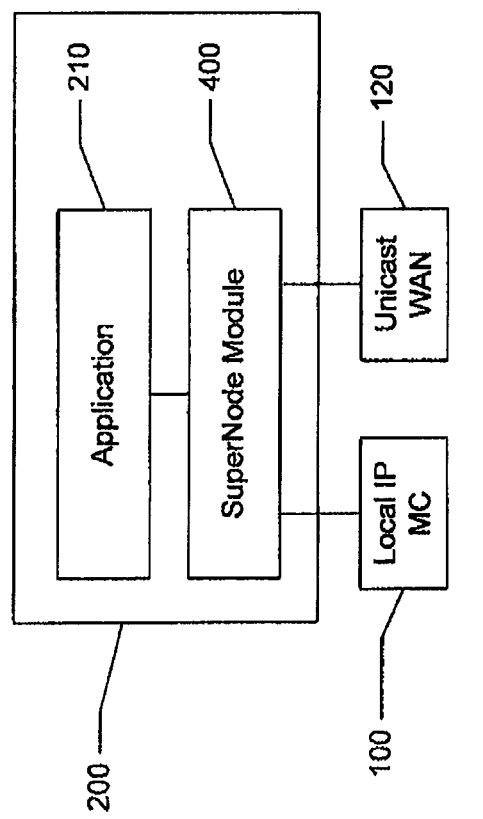
FIG. 2 is a logical system block diagram in accordance with one embodiment. The diagram shows the manner in which, within an endpoint device 200, an application module 210 logically couples to an instance 400 of an embodiment. The instance 400, in turn, is coupled to the local network using IP multicast 100 as well as the unicast network 120.
Figure 3:
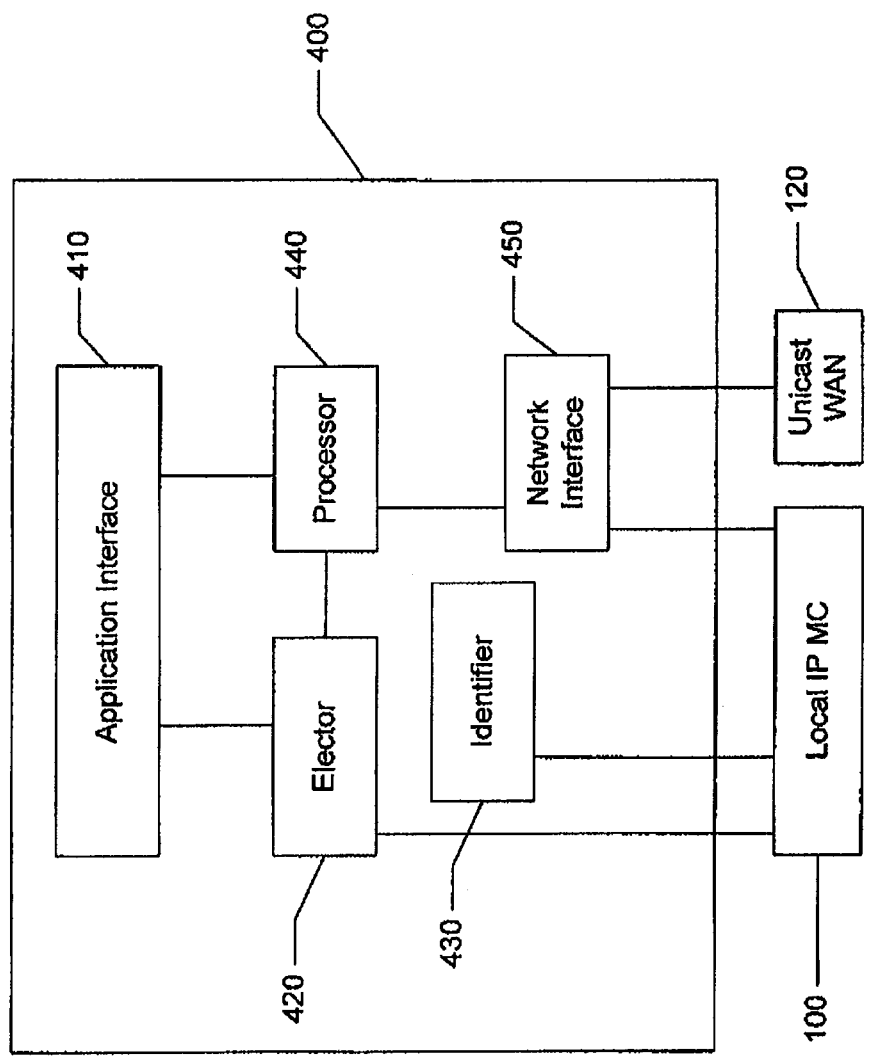
FIG. 3 is a logical system block diagram depicting example components according to one embodiment 400.

An embodiment of a Supernode module 400 as depicted in FIG. 2 and FIG. 3, upon learning of the unique IP address/port pairs of the IP multicast data streams that an application 210 is currently processing, creates a state machine within itself in elector module 420 to represent that particular address/port pair. Such learning may occur in a multitude of ways including, but not limited to, static configuration, via an application programming interface 410 provided to the application by an embodiment, and through insertion in the pathway between the application and the IP multicast network.

In a similar embodiment, the elector module 420 is responsible for determining whether the current instance of the embodiment will be responsible for processing IP multicast traffic across a unicast network, or whether another instance on the same IP multicast network will be the responsible proxy entity. Such determination of a state of being active or inactive is made through a state machine diagrammed in FIG. 4 wherein an election token, once generated by each instance of the elector on the network, is utilized in conjunction with the state machine's operation. The token may take the form of a simple random number or be calculated using varying degrees of sophistication including, but not limited to, the device's current resource utilization including, but not limited to memory, CPU, network bandwidth, and disk space. The election token may also include a variety of other components such as instance rank level, values indicating a device's desire (or lack thereof) to become active, etc. Note that the list presented is not fully exhaustive of the various ways in which an election token may be determined.

Figure 4:
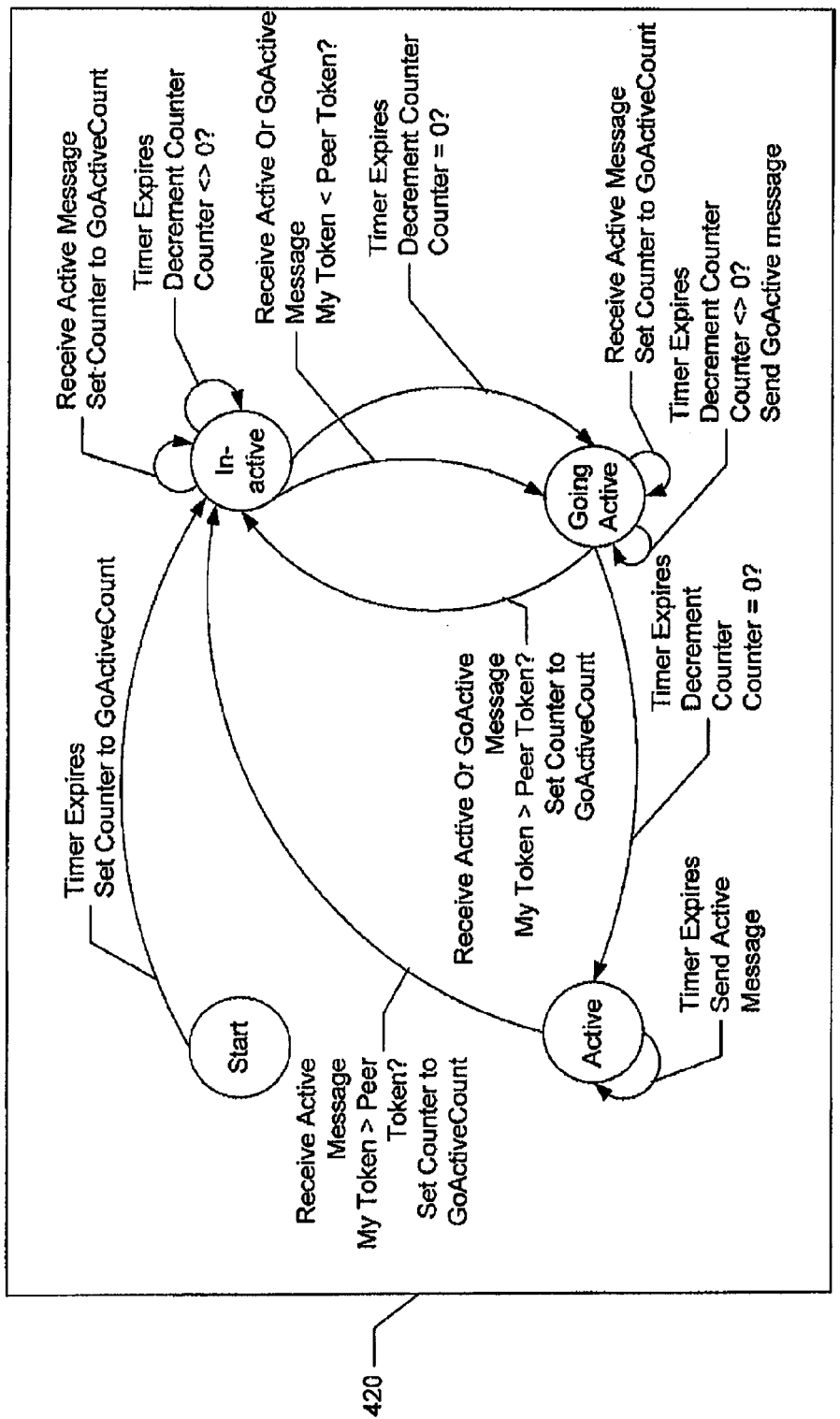
FIG. 4 a logical state transition diagram according to one embodiment. The diagram depicts the state transition model followed by an elector module 420 in determining whether a node is to transition between active and inactive states.

In an embodiment of the elector module 420 described in FIG. 4, the state machine within the elector module 420, transitions between different states. The elector listens on the local IP multicast for election tokens from other instances of the elector or similarly implemented or compatible embodiments on that IP multicast network. Upon receipt of varying messages types and/or expiration of a timer within the elector module, the state machine determines, based on comparison of numerical values of the election token received from peers (denoted as "Peer Token" in FIG. 4) and its own token (denoted as "My Token" in FIG. 4), whether the current instance of the embodiment shall transition to active or inactive states. In one example embodiment, a particular elector module 420 "wins" the election if its token (in the form of a random number) has the least/smallest value as compared to the random number value of the tokens of its peers. Of course, this is only one example implementation for determining a winner—other embodiments may use other types of criteria for determining the winner of the election.

In the event an instance transitions to an active state, that instance begins transmitting its own token onto the local IP multicast network such that other instances of the elector on such local IP multicast may process the token according to similar or compatible embodiments of the state machine logic.

Upon determination that the current entity is to be the active entity, the processor module 440 is notified of such determination—constituting an activation of forwarding of IP multicast data traffic across a unicast network connection. At the same time, the elector transitions to a state of sending out its own beacon until such time that another elector on the network takes over control as described above.

Once forwarding is activated, the processor module 440 captures IP multicast traffic received and transmitted by the application 210, forwarding such traffic across the unicast network connection 120 via the network interface module 450. Such forwarding takes places in one embodiment only if the far-end has registered a desire in receiving such traffic. Such determination is made by the far-end and communicated to the processor module 440 on the local active entity via the unicast connection 120.

Processor

Figure 6:
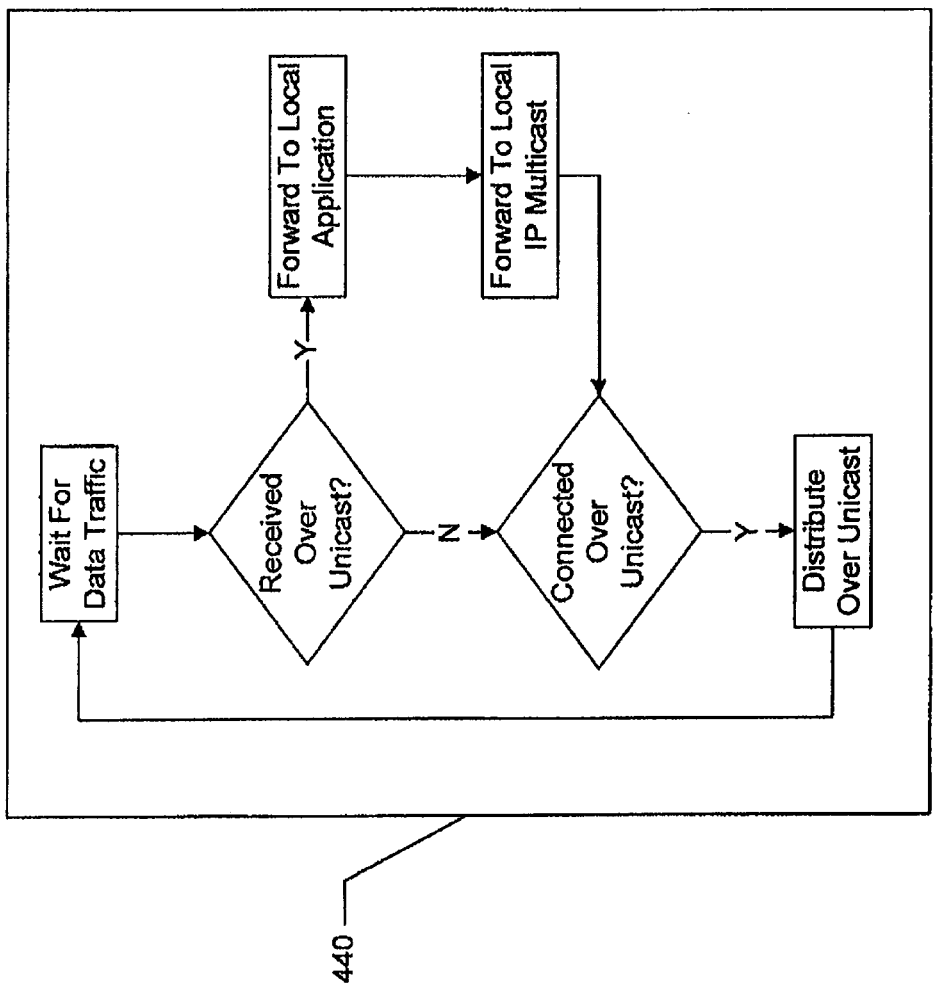
FIG. 6 is a logical flow chart diagram according to one embodiment. The diagram describes the procedure followed within a processor module 440 to forward data traffic received into the module 400 either through the capture of data traffic to or from the local IP multicast 100 or of data traffic received over the unicast WAN connection 120.

The operation of the processor 440, as depicted in FIG. 6 rests in one embodiment on the source of the data traffic entering the processor module. If the traffic was received over a unicast connection, that data traffic is passed on to the hosting/coupled application; giving the application the appearance that the data traffic was received on its own local IP multicast interface. Such passing of data traffic from the embodiment to the hosting/coupled application may take a number of forms including, but not limited to, notification from the embodiment to the application through an application programming interface or insertion into the data traffic flow between the application and the network interface.

If the traffic was received from the application either through notification of the application to the instance of the embodiment through an application programming interface, through insertion into the flow of network data traffic between the application and the network interface, or other viable means of interception or data traffic capture; that data is encrypted, encapsulated, and distributed via the processor module 440 to all far-end entities coupled to the instance of the embodiment and who have registered a desire to receive such traffic.

In an embodiment, the processor module 440 makes use of well-known encryption logic such as the Advanced Encryption Standard (AES) or other suitable encryption technique to encrypt data to be transmitted across the unicast network 120. The receiving end of the unicast connection 120, upon receiving data traffic from a unicast transmitter, proceeds to decrypt that data traffic using the decryption logic employed by the encryption module on the transmitting end.

Additionally, in an embodiment, the processor module 440, may optionally make use of data filtering and conversion functionality to facilitate enhanced transmission of forwarded data across the unicast connection 120. Such data filtering may include, but is not limited, to media re-packetization and transcoding; being the conversion of such media between different data packet sizes and/or encoding types for purposes of bandwidth reduction, media enhancement, and other media-modification features desired by a user. Data filtering may also include specialized data caching to further reduce the transport of redundant data across the unicast link.

Site Identification

Returning to FIG. 5 wherein determination of a site identifier is depicted, an instance of an embodiment determines, at initiation of operation, what the unique identifier is for the location or "site" where the instance is operating. Such an identifier is useful to the efficient operation of the embodiment as it is used to communicate to nodes at other sites the fact that a particular site—including the individual application entities at that site—are no longer present on the network. (The term "network" here being understood for one embodiment to be the entire network and not just the individual site network or component of the entire network). Such tracking of the presence of individual devices at remote locations allow devices at other locations to quickly and efficiently add or remove presence information of said devices in the event of network outages and other unforeseen events.

Figure 5:
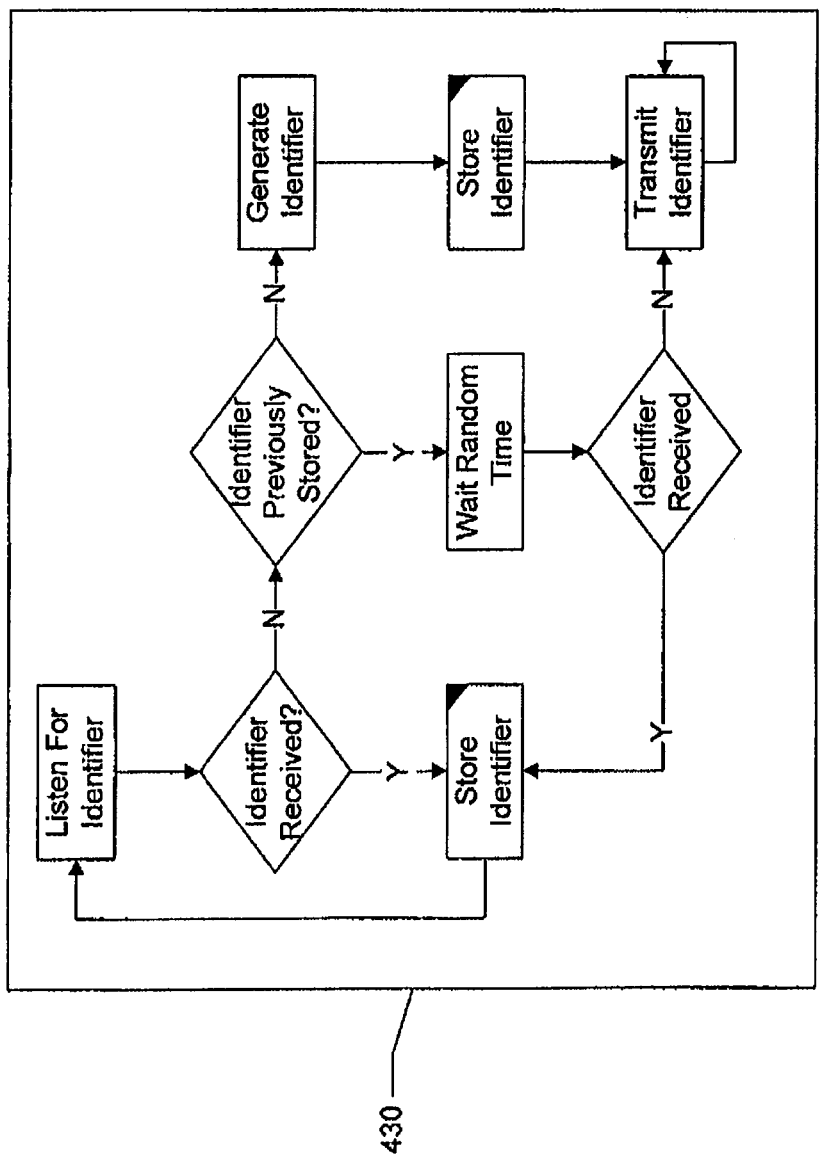
FIG. 5 a logical flow chart diagram according to one embodiment. The diagram depicts the procedure followed within an identifier module 430 to determine site identification amongst nodes on an IP multicast network.

In an embodiment, determination of the site identifier is accomplished by the flow chart depicted in FIG. 5. At initiation of activity, a local instance of the identifier module 430 begins by listening on the local IP multicast network for a message from another similar or compatible entity transmitting a site identifier. If such a message is received, the local instance stores this identifier and proceeds to use it in its operation as described below.

If no such identifier is received within a reasonable time, the local instance determines whether it had previously received and stored an identifier. If this is not the case, the local instance proceeds to generate and store its own unique identifier according to a unique identifier generation scheme such as the algorithm utilized to calculate a Globally Unique Identifier (GUID).

Subsequently, the local instance begins on-going transmission of the site identifier—whether previously received and stored or previously generated and stored. Once this process begins, an embodiment will continue to do so until such time the instance of the embodiment becomes inactive or is shut down.

Session Setup

In an embodiment, establishment and maintenance of a "session" between two unicast entities is contemplated. Such a session is deemed to be established and maintained for the duration of the existence of a need for the two entities on either end of a unicast network to be coupled.

Figure 7:
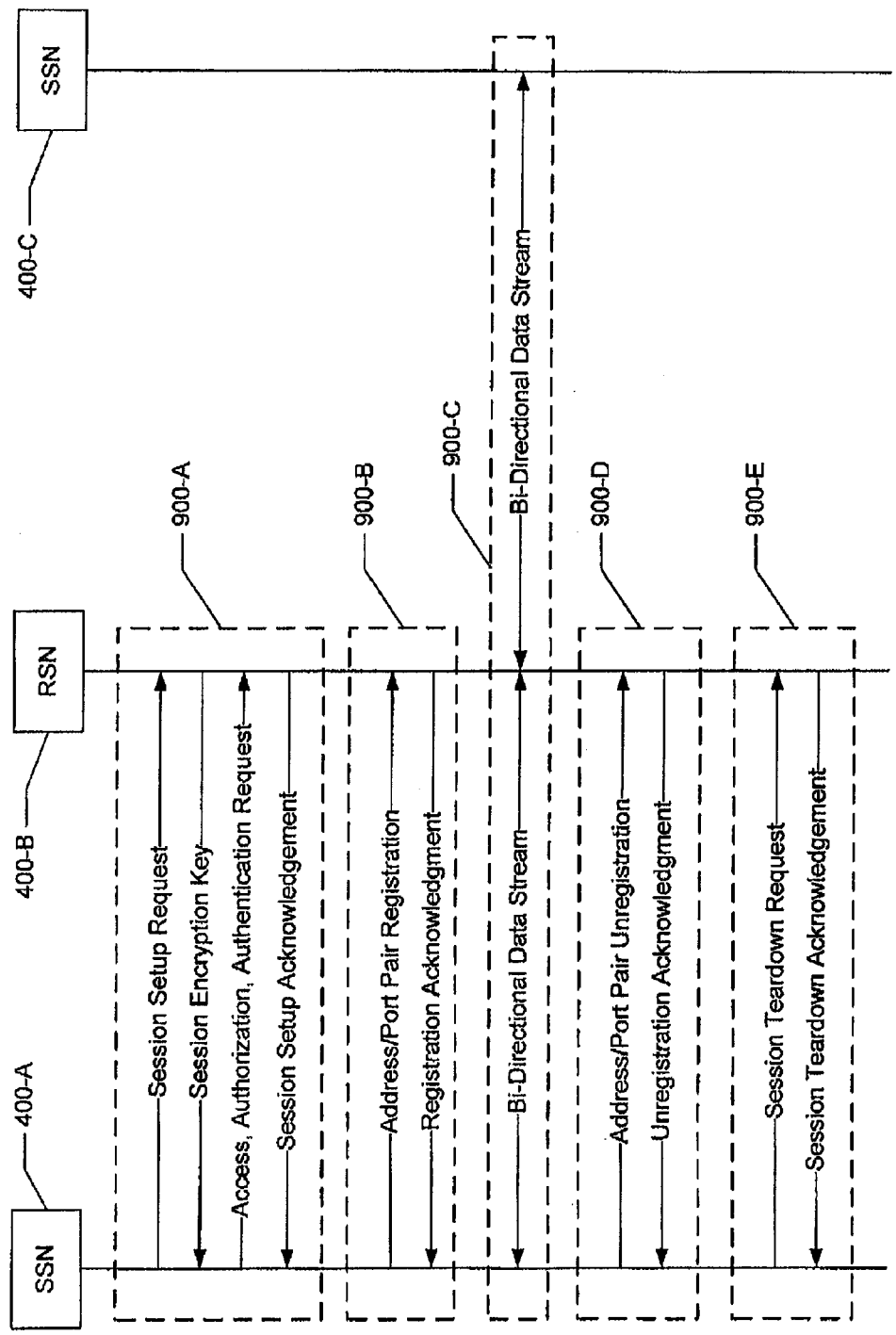
FIG. 7 is logical transaction diagram according to one embodiment. The diagram shows the interaction between a Supernode 400-A, a Routing Supernode 400-B, and a third Supernode 400-C. The various stages of interaction include a session setup stage 900-A, a registration stage 900-B, a data streaming stage 900-C, an unregistration stage 900-D, and a session teardown stage 900-E. To reduce complexity of the diagram, only stage 900-C is depicted as including Supernode 400-C. It should be understood that the same interaction present between nodes 400-A and 400-B is present between nodes 400-C and 400-B, as well as between other Supernodes that may be present.

In an embodiment, the establishment of a session is implemented via a reliable unicast connection such as TCP between two entities—for example nodes 200-F and 200-A from FIG. 1 and depicted as 400-A and 400-B in FIG. 7. Such establishment as shown in FIG. 7 item 900-A comprises, of a multi-stage interaction wherein the connecting entity 400-A initiates a connection through a session setup request to entity 400-B. Such request, upon being received by the entity 400-B causes entity 400-B to generate a session encryption key to be used for encryption purposes in all subsequent interactions. The generation of the session encryption key may take the form of a number of methods including, but not limited to, public/private key generation as part of an asymmetric cryptography technique such as Diffie-Heiman, DSS, and RSA. This key is then communicated back to entity 400-A from entity 400-B using the unicast connection established during the entity 400-A's session setup request.

The next step during stage 900-A constitutes entity 400-A encrypting (using the encryption keys generated and agreed upon during the step described above and an agreed-upon or previously configured algorithm such as AES) access, authentication, and authorization (AAA) information including, but not limited to, a system identifier, a unique location or "site" identifier, client authorization and other identifying characteristics required for the establishment of a session between entity 400-A and 400-B. Such encrypted information is transmitted to entity 400-B by entity 400-A over the unicast connection.

Upon receipt of aforementioned AAA information, entity 400-B proceeds to grant or deny access to entity 400-A—resulting in the final step in stage 900-A of an acknowledgement of the session establishment. Such processing of AAA information may include, but not be limited to, self-processing by entity 400-B or entity 400-B interfacing with an external entity such as RADIUS or ActiveDirectory for full or partial processing of the AAA information.

Session Streaming

Upon establishment of the session, an embodiment causes an iterative interaction 900-B, 900-C, and 900-D to ensue over the course of time, during which entity 400-A registers its intent to forward and receive data traffic for unique address/port pairs the hosting/coupled application is processing. Such intent is based on activation of the processor module for unique address/port pairs as determined by the elector module 420 and described above. During a registration, entity 400-A notifies its intent to forward and receive traffic for unique stream identifiers, including but not limited to, address/port pairs by transmitting details of said stream identifiers to the routing entity 400-B. This action causes entity 400-B to establish forwarding and routing tables within itself in processor module 440 such that traffic received into entity 400-B is forwarded to other coupled entities over unicast whom have similarly registered such stream identifiers. In response to the registration notification as described above, entity 400-B transmits back to entity 400-A acceptance of the registration notification. This action causes entity 400-A to begin forwarding of self-generated and local IP multicast traffic as, described above, to entity 400-B for distribution according to the logic flow chart depicting such in FIG. 6. This action also causes entity 400-B to include distribution of locally received IP multicast data as well as data received over unicast from other coupled entities (such as 400-C in FIG. 7) to entity 400-A.

Streaming of data over the unicast connection is then maintained for the duration of the registration. In an embodiment, such streaming may occur over a reliable unicast connection (such as TCP), over a "best-effort" connection utilizing a protocol such as UDP, or combination thereof according to desired preconfigured or dynamically determined performance requirements. In an embodiment, and where a best-effort unicast connection is utilized for data streaming, entities participating in the unicast data stream connection may actively communicate from receiving entity to transmitting entity information such as packet loss statistics and recommendations for packet loss concealment techniques to be employed. Such packet loss concealment techniques include, but are not limited to, oversending of packets by the transmitting entity, inclusion of components of previously transmitted packets within a packet, sequence numbers to track lost packet numbers for purposes of requesting resends of individual lost packets, and so forth. Note that numerous varieties and embodiments of packet loss concealment techniques exist and the afore-mentioned list does not constitute an exhaustive list of such techniques that may be employed by an embodiment.

In an embodiment, data streamed over the unicast connection (reliable, best-effort, or otherwise) is encrypted utilizing the previously described encryption keys and associated algorithms. Such encrypted data constitutes the payload being transmitted over the unicast connection and is preceded by encapsulation information such that the receiving entity may properly process the streamed data. Such encapsulation information includes, but is not limited to, the unique identifier of the transmitting entity and the source stream identifier from whence the payload was obtained (and therefore the destination to which the transmitting unicast endpoint wishes the data to be forwarded to). Such streaming interaction continues for the duration of the registration.

In the event a node such as 400-A becomes inactive for a particular stream identifier in accordance with the election logic detailed earlier, node 400-A proceeds to notify entity 400-B of its intent to stop further processing of data for that particular stream identifier. Such notification is similar in nature to the registration process described earlier—the difference being that an unregistration is performed rather than a registration operation. In response, entity 400-B proceeds to remove from its routing table details of forwarding for the unique stream identifier for the unregistering entity and ceases to process data traffic received over the unicast connection from that entity.

Part of the process of streaming data is the contemplation of detection of duplicated data. Such an event may occur due to a variety of reasons including, but not limited to transmission latency over the various intervening networks, erroneous implementations within embodiments, invalid configurations by maintenance personnel or systems, and so forth. Such occurrences' may result in temporary or sustained duplication of data traffic received from simultaneously active nodes within a particular IP multicast network.

Duplicate Detection

In an embodiment, duplicate detection falls within the purview of the processor module 440, which examines each packet and keeps track of a list of previously processed packets. For each packet a unique signature is calculated according to the MD5 algorithm. This signature is stored in a list and the signature of each packet entering the processor module 440 is compared against this list. In the event a duplicate signature is found and certain thresholds are met, the packet is rejected—preventing further forwarding of the duplicate packet and thereby creating a packet loop. The parameters defined for the length of the list and the relevant thresholds beyond which packets are not forwarded may be actively determined by the embodiment and/or defined by personnel or other devices acting in a maintenance role. It is noted that in one embodiment, the algorithm used for packet signature determination may include MD5 but is not limited to such algorithm. Any viable and applicable algorithm may be utilized for this purpose in various embodiments.

In summary of this description, interactions 900-B, 900-C, and 900-D continue iteratively over the course of the session being established.

Session Teardown

In the event an entity of an embodiment becoming wholly inactive or in the situation where no stream identifier are being processed by said entity, the session previously established during step 900-A is destroyed. This interaction takes the form of step 900-E wherein a session teardown message is transmitted by entity 400-A to entity 400-B. The action taken by entity 400-B in response to such message is to remove all entries for entity 400-A from its internal routing tables and to cease forwarding traffic to or processing traffic from entity 400-A. In an embodiment, such "ordered" teardown is not strictly required as a simple disconnection of the unicast connection between the entities is sufficient enough to constitute an automatic tear down within each entity.

The various operations represented in the illustrated flowcharts and described above can be implemented in one embodiment by software or other computer-readable instructions encoded on or otherwise stored on a computer-readable medium (such as a memory in the form of ROM, RAM, other type of hardware memory), and executable by one or more processors. For example, the processor and computer-readable medium storing the computer-readable instructions can be present in one or more of the devices described above, such as at the devices implementing the nodes 200-A, 200-F, etc. The processor 440, for example in one embodiment, of the node 200 can execute the computer-readable instructions stored in a memory or other computer-readable storage medium at the node 200. In one embodiment, the various modules/components shown in FIGS. 2-3 can be implemented by software, hardware, and/or a combination of both. For instance, the application 210 and certain components of the module 400 (shown in FIG. 3) can be implemented as software stored on the computer-readable medium, and executable by the processor 440 (such as a processor implemented at least in part by hardware).

The various embodiments described above can be combined to provide further embodiments. All of the above U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

The above description of illustrated embodiments, including what is described in the Abstract, is not intended to be exhaustive or to limit the embodiments to the precise forms disclosed. While specific embodiments and examples are described herein for illustrative purposes, various equivalent modifications are possible and can be made.

For example, embodiments are not restricted to any particular data type, end device type, data format, communication format or protocol, manufacturer device model, network device type, specific sequence of operations (for example, some operations described herein may be performed sequentially and/or simultaneously), etc.

These and other modifications can be made to the embodiments in light of the above detailed description. The terms used in the following claims should not be construed to be limited to the specific embodiments disclosed in the specification and the claims. Instead, the terms used in the claims should be construed to include all possible embodiments along with the full scope of equivalents to which such claims are entitled. Accordingly, the claims are not limited by the disclosure.

What is claimed is:

1. A method for communicating in a communication network environment, said environment including at least a first, a second, and a third local area network (LAN) separated from each other by a wide area network (WAN), said LANs being IP-multicast-capable and said WAN being non-IP-multicast-capable, the method comprising:

electing a device in said first LAN as a first distributed convergence node;

designating a device in said second LAN as a second distributed convergence node, said second distributed convergence node being a routing distributed convergence node;

electing a device in said third LAN as a third distributed convergence node, said routing distributed convergence node in the second LAN being configured to forward multicast data from each elected distributed convergence node of a plurality of LANs including the first and third LANs to each other elected distributed convergence node of the plurality of LANs using unicast connections through said non-IP-multicast-capable WAN; and communicating multicast data between said first and said third distributed convergence nodes through said non-multicast-capable WAN via said routing distributed convergence node, wherein said multicast data is communicated between devices within each of said LANs using IP multicast connections, and wherein said multicast data is communicated between said first distributed convergence node and said routing distributed convergence node and between said routing distributed convergence node and said third distributed convergence node using unicast connections through said non-multicast-capable WAN.

2. The method of claim 1 wherein designating the device in said second LAN as the second distributed convergence node includes electing said device as the routing distributed convergence node.

3. The method of claim 2 wherein electing a device in any of said LANs as a distributed convergence node includes electing a component of an application in said device as a distributed convergence node.

4. The method of claim 1 wherein said communicating multicast data between said first and third distributed convergence nodes through said non-multicast-capable WAN via said routing distributed convergence node includes transparently communicating across said WAN via said routing distributed convergence node, such that each of said first and third distributed convergence nodes communicate with each other via said routing distributed convergence node.

5. The method of claim 1, further comprising at least one or more of:
   determining a site identifier associated with each distributed convergence node;
   applying security to said multicast data sent to and from said routing distributed convergence node; or
   performing encapsulation of said multicast data sent to and from said routing distributed convergence node.

6. The method of claim 1 wherein each distributed convergence node is adapted to receive first multicast data from any other device in their respective LAN via at least one of said IP multicast connections and is adapted to forward said first multicast data to said routing distributed convergence node via at least one of said unicast connections, and is further adapted to receive second multicast data from said routing distributed convergence node via at least one of said unicast connections and to distribute said second multicast data to devices in their respective LAN via at least one of said IP multicast connections.

7. The method of claim 1 wherein said electing includes using a state machine process to activate a state of a device to indicate election thereof, a deactivated state of said device indicating non-election thereof.

8. The method of claim 1 wherein said communicating includes:
   performing a session setup stage between said first distributed convergence node and said routing distributed convergence node;
   performing a registration stage between said first distributed convergence node and said routing distributed convergence node;
   conducting a data streaming stage between said first distributed convergence node and said routing distributed convergence node and between said routing distributed convergence node and said third distributed convergence node;
   performing an unregistration stage between said first distributed convergence node and said routing distributed convergence node; and
   performing a session teardown stage between said first distributed convergence node and said routing distributed convergence node.

9. A system for communicating in a communication network environment, said environment including at least a first, a second, and a third local area network (LAN) separated from each other by a wide area network (WAN), said LANs being IP-multicast-capable and said WAN being non-IP-multicast-capable, the system comprising:
   first distributed convergence node means in said first LAN for communicating multicast data with devices in said first LAN using IP multicast connections and for communicating said multicast data from said devices over said non-IP-mulitcast-capable WAN via a first unicast connection;
   second distributed convergence node means in said second LAN for receiving said multicast data communicated via said first unicast connection over said non-IP-multicast-capable WAN from said first distributed convergence node means, said second distributed convergence node means being a routing distributed convergence node means for forwarding said multicast data over said non-IP-multicast-capable WAN using a second unicast communication;
   third distributed convergence node means in said third LAN for receiving said multicast data communicated by said routing distributed convergence node means over said non-IP-multicast-capable WAN using said second unicast connection, said third distributed convergence node means further being for distributing said received multicast data to devices in said third LAN via IP multicast connections and for communicating multicast data from said devices over said non-multicast-capable WAN to said routing distributed convergence node means via a third unicast connection, said routing distributed convergence node means in the second LAN being configured to forward multicast data from each elected distributed convergence node means of a plurality of LANs including the first and third LANs to each other elected distributed convergence node means of the plurality of LANs using unicast connections through said non-IP-multicast-capable WAN; and
   electing means for electing a device as said first, second, and third distributed convergence node means, said distributed convergence nodes means being dynamically changeable as a result of said electing.

10. The system of claim 9, further comprising at least one or more of:
   means for determining a site identifier associated with each distributed convergence node means;
   means for applying security to multicast data sent to and from said routing distributed convergence node means;
   means for detection duplicate packets in traffic; or
   means for performing encapsulation of said multicast data sent to and from said routing distributed convergence node means.

11. The system of claim 9, further comprising:
   means for performing a session setup stage between said first distributed convergence node and said routing distributed convergence node means;
   means for performing a registration stage between said first distributed convergence node means and said routing distributed convergence node means;
   means for conducting a data streaming stage between said first distributed convergence node means and said routing distributed convergence node means and between said routing distributed convergence node means and said third distributed convergence node means;
   means for performing an unregistration stage between said first distributed convergence node means and said routing distributed convergence node means; and
   means for performing a session teardown stage between said first distributed convergence node means and said routing distributed convergence node means.

12. The system of claim 9 wherein said first, said second, and said third distributed convergence node means include a component of an application residing on a device.

13. An apparatus adapted to be used in a communication network environment, said environment including at least a first, a second, and a third local area network (LAN) separated from each other by a wide area network (WAN), said LANs being IP-multicast-capable and said WAN being non-IP-multicast-capable, the apparatus comprising:
- a device having a distributed convergence node module, said distributed convergence node module including:
- an elector module to elect said device as a first distributed convergence node in said first LAN;
- an identifier module to identify said device from other devices in said first LAN, including identification of said device as the elected first distributed convergence node; and
- a network interface in cooperation with a processor to communicate multicast data with said other devices in said first LAN using IP multicast connections and to communicate said multicast data with a routing distributed convergence node in said second LAN via said non-IP-multicast-capable WAN using unicast connection if said device is elected as the first distributed convergence node, so as to enable said routing distributed convergence node to forward said multicast data via said non-IP-multicast-capable WAN between said first distributed convergence node in said first LAN and a third distributed convergence node in said third LAN using a second unicast connection, the routing distributed convergence node in said second LAN being configured to forward multicast data from each elected distributed convergence node of a plurality of LANs including the first and third LANs to each other elected distributed convergence node of the plurality of LANs using unicast connections through said non-IP-multicast-capable WAN.

14. The apparatus of claim 13 wherein said distributed convergence node module is embodied in software executable by said processor.

15. An apparatus adapted to be used in a communication network environment, said environment including at least a first, a second, and a third local area network (LAN) separated from each other by a wide area network (WAN), said LANs being IP-multicast-capable and said WAN being non-IP-multicast-capable, the apparatus comprising:
- a device having a routing distributed convergence node module, said routing distributed convergence node module including:
- an elector module to elect said device as a routing distributed convergence node in said second LAN;
- an identifier module to identify said device from other devices in said second LAN, including identification of said device as the elected routing distributed convergence node; and
- a network interface in cooperation with a processor to communicate multicast data with said other devices in said second LAN using IP multicast connections and to communicate said multicast data with a first distributed convergence node in said first LAN via said non-IP-multicast-capable WAN using a first unicast connection and to communicate said multicast data with a third distributed convergence node in said third LAN via said non-IP-multicast-capable WAN using a second unicast connection, so as to forward said multicast data between said first and third distributed convergence nodes over said non-IP-multicast-capable WAN using said first and second unicast connections, said routing distributed convergence node in the second LAN being configured to forward multicast data from each distributed convergence node of a plurality of LANs including the first and third LANs to each other distributed convergence node of the plurality of LANs using unicast connections through said non-IP-multicast-capable WAN.

16. The apparatus of claim 15 wherein said routing distributed convergence node module is embodied in software executable by said processor.

17. The apparatus of claim 15 wherein said routing distributed convergence node module is adapted to perform a session setup stage between said first distributed convergence node and said routing distributed convergence node, perform a registration stage between said first distributed convergence node and said routing distributed convergence node, conduct a data streaming stage between said first distributed convergence node and said third distributed convergence node, perform an unregistration stage between said first distributed convergence node and said routing distributed convergence node, and perform a session teardown stage between said first distributed convergence node and said routing distributed convergence node.

18. An article of manufacture adapted to be used in a communication network environment, said environment including at least a first, a second, and a third local area network (LAN) separated from each other by a wide area network (WAN), said LANs being IP-multicast-capable and said WAN being non-IP-multicast-capable, the article of manufacture comprising:
- a non-transitory computer-readable storage medium adapted to be installed in a device and having computer-readable instructions stored thereon that are executable by a processor to:
- elect said device as a distributed convergence node;
- identify said device from other devices in a same LAN as said device, including identification of said device as the elected distributed convergence node;
- communicate multicast data with said other devices in the same LAN using IP multicast connections and communicate said multicast data with another distributed convergence node via said non-IP-multicast-capable WAN using a first unicast connection, so as to enable transparent communication of said multicast data between distributed convergence nodes of different LANs via the non-IP-multicast-capable WAN using unicast connections in a manner that makes said non-IP-multicast-capable WAN appear to be IP-multicast-capable; and
- forward multicast data from each distributed convergence node of a plurality of LANs including the first, third and the different LANs via a routing distributed convergence node in the second LAN to each other elected distributed convergence node of the plurality of LANs using unicast connections through said non-IP-multicast-capable WAN.

19. The article of manufacture of claim 18 wherein said non-transitory computer-readable storage medium is located in said device, which is elected as said routing distributed convergence node.

20. The article of manufacture of claim 18 wherein said non-transitory computer-readable storage medium is located in said device, which is elected as a distributed convergence node to communicate with the routing distributed convergence node, such that said elected distributed convergence node communicates said multicast data with said routing distributed convergence node over said non-IP-multicast-capable WAN using a first of said unicast connections so as to enable said routing distributed convergence node to forward said multicast data over said non-IP-multicast-capable WAN to another distributed convergence node of another LAN of the plurality of LANs using a second of said unicast connections.

* * * * *